United States Patent [19]

Brastow et al.

[11] Patent Number: 4,468,553
[45] Date of Patent: Aug. 28, 1984

[54] AUTOMATIC CHAIN WELDING APPARATUS

[75] Inventors: Carl H. Brastow, Foxboro, Mass.; Joel D. Mallett, Warwick, R.I.

[73] Assignee: Conceptual Engineering Associates, Inc., Foxboro, Mass.

[21] Appl. No.: 367,942

[22] Filed: Apr. 13, 1982

[51] Int. Cl.$^3$ ............................................. B23K 9/00
[52] U.S. Cl. ................................. 219/51; 219/125.1; 219/136
[58] Field of Search .................. 219/51, 52, 56, 56.1, 219/56.22, 136, 125.1

[56] References Cited

U.S. PATENT DOCUMENTS 3,355,876 12/1967 Oettinger et al. ............... 219/51
4,388,513 6/1983 Brastow et al. ................. 219/51

FOREIGN PATENT DOCUMENTS 1345442 1/1963 France ....................... 219/136

*Primary Examiner*—C. C. Shaw
*Attorney, Agent, or Firm*—John A. Haug

[57] ABSTRACT

Welding of similar and dissimilar metals such as fine wires of gold, silver, brass and others to provide required strength without marring the surfaces of the link is accomplished by mounting an electrode (75,264) a selected distance from the surfaces to be welded. A first high voltage ionizing arc of a selected atmosphere between the electrode and the surfaces to be welded is followed by a low voltage, high amperage welding arc. An electrode (75) is mounted in a discontinuous link forming machine (10) so that it can be oriented in optimum position relative to the work piece (9). An electrode (264) is mounted in an automatic chain making machine (200) so that it can be optimally adjusted in x and y directions employing target adjustment block 320, as well as in the z direction employing vertical adjustment block 290. The electrode (264) is mounted within an electrode head (260) provided with a tip portion (274) having a biased formed face (272) forming a weld window which is maintained free of slag build up by a combination of an inflexible wiper (384) and a flexible wiper (388).

23 Claims, 29 Drawing Figures

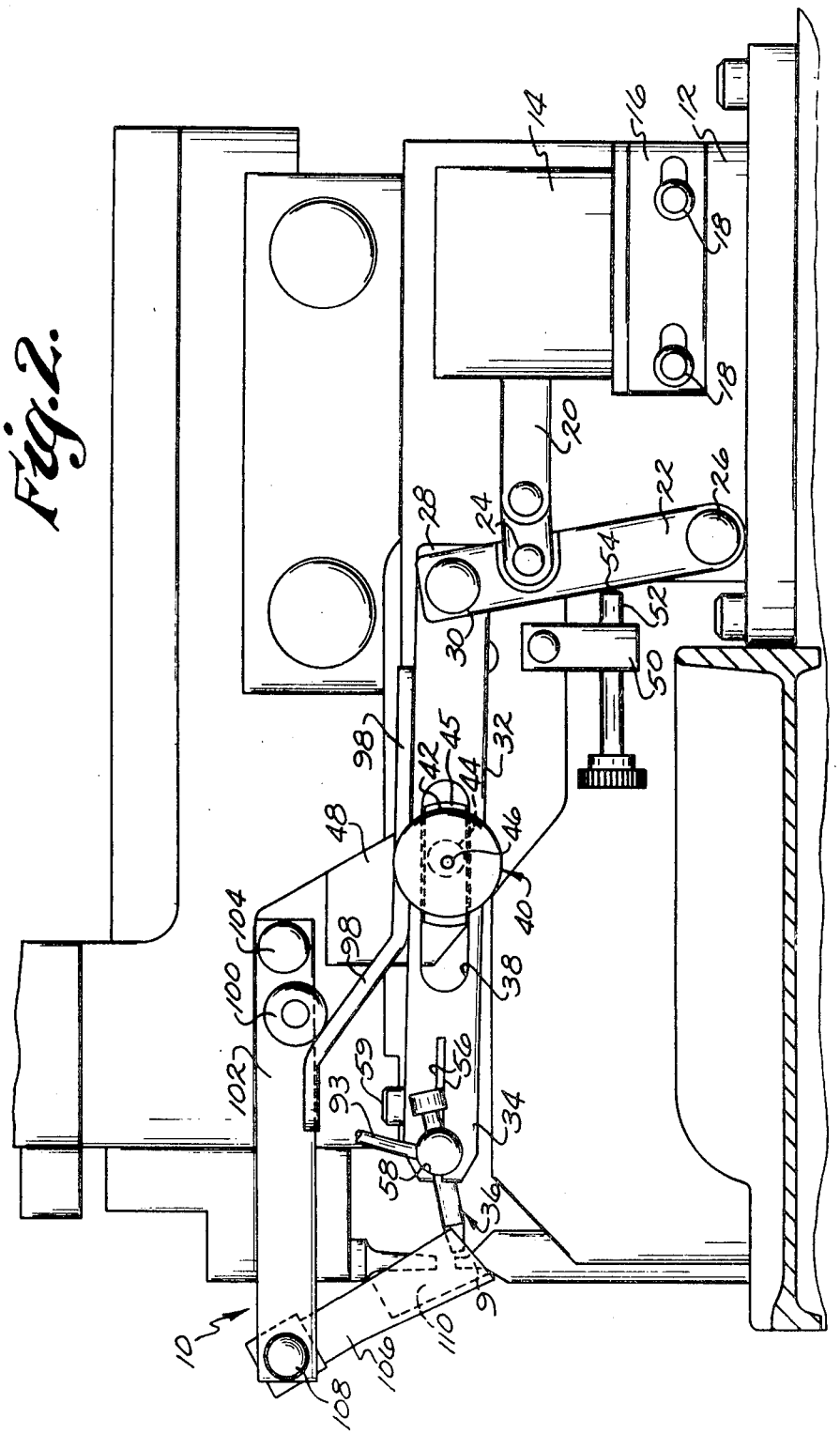

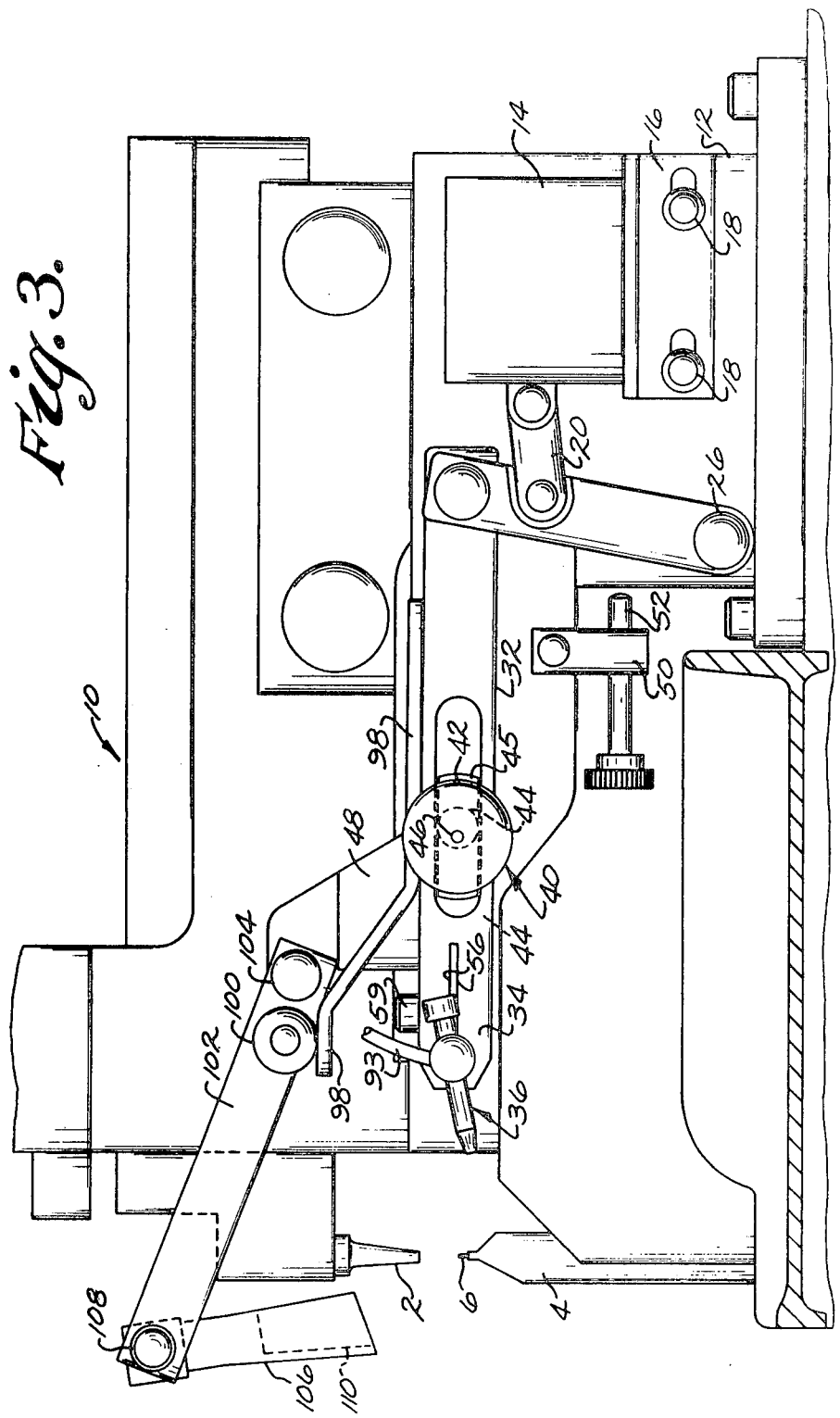

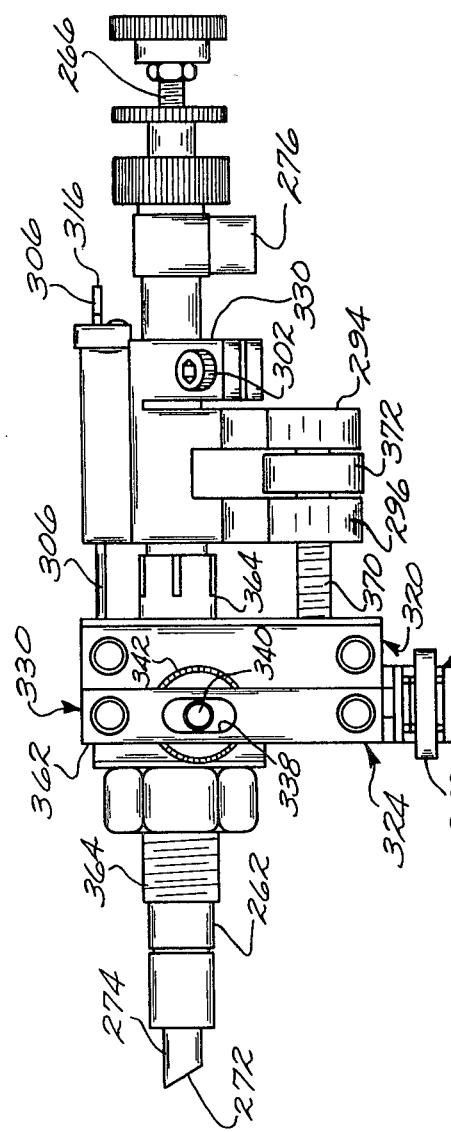

AUTOMATIC CHAIN WELDING APPARATUS

TECHNICAL FIELD

This invention relates generally to welding apparatus and more specifically to apparatus for welding the link joint formed by automatic chain making machines used for example in the manufacture of jewelry chains of gold, silver, copper, steel aluminum and their alloys.

RELATED APPLICATIONS

The present application contains subject matter disclosed in application Ser. No. 229,553 filed Jan. 29, 1981, now U.S. Pat. No. 4,388,513, which issued June 14, 1983 and is assigned to the assignee of the present invention.

BACKGROUND ART

In making chain it is conventional to utilize apparatus which automatically forms links from a straight strand of wire of a selected diameter ranging anywhere from 0.003 inch to 0.250 or more. The wire is fed into the machine, bent into a single loop having a generally spiral configuration, severed from the straight strand, bent to close the link in a generally circular configuration, then positioned so that the strand of wire which is advanced is threaded through the closed link. The cycle is repeated to form a selected length of chain. The chain links are formed with butt or biased ends which are either in physical engagement with one another or separated by a few thousandths of an inch or more. Conventionally the chain links are then subjected to a soldering operation to ensure the finished product is sufficiently strong for its intended purpose. The soldering operation involves packing the chain to mask and protect it while the chain is subjected to elevated temperatures in a soldering furnace. The wire employed for the chain is either solder cored wire or solder powder must be separately placed between each link joint to prepare it for soldering. In any event, the labor content in manufacturing such chain is significantly increased due to the requirement of the soldering operation, the yield is decreased due to links being deformed during handling; materials cost are increased due to the requirement of solder and masking materials and capital equipment expenses are increased due to the furnaces as well as energy costs for operating such furnaces.

In copending application Ser. No. 229,553 referenced above, apparatus and methods of welding separate links of wire of the same type as that used in making chain is disclosed and claimed. As set forth in that application, a welding head is mounted adjacent a link forming mechanism and is adapted to be moved to and from the link forming work station. A complete cycle for forming and welding a link is initiated by actuating a switch which causes a camming head to descend and bend the distal end portions of two upstanding legs of a generally U-shaped work piece into a closed link. The camming head then ascends and an electrode head moves to the work piece and is positioned a selected distance therefrom. A selected gas is directed to the work area and the atmosphere between the electrode and the work piece is ionized. Once the proper level of ionization is achieved, a welding arc travels from the electrode to the work piece to effect the weld. The electrode head then retracts, the work piece is released and a new work piece is presented at the work station to complete the cycle. This apparatus and method has proven to be very effective in welding wire links providing a good strong joint with minimal marring of the link surface. It is an object of the present invention to adapt the apparatus and method set forth in the referenced application Ser. No. 229,553 to make it suitable for use with existing automatic chain making machines. Another object is the provision of welding apparatus for use with automatic chain making machinery which will obviate conventional soldering operations heretofor used. Another object of the invention is the provision of welding apparatus which is simple, reliable and yet usable with a variety of different types of automatic chain making machinery including machinery in which the chain link is moved to the various operations at the work stations as well as machinery in which the chain link is held stationary and processing elements are brought to it.

DISCLOSURE OF INVENTION

Briefly, in accordance with the invention a welding head is mounted adjacent to the chain link forming mechanism in a two portion target support block which provides precise adjustment of the electrode head in both an x and a y direction. An electrode head support sleeve is fixedly attached to one portion of the support block and a first thumb wheel is effective to move one block portion relative to the other for adjustment in the first or x direction while another thumb wheel is effective to move the one block portion relative to the other for adjustment in the second or y direction. A separate vertical support having a bore extending therethrough in which the electrode head is disposed is provided with a pair of hooks which interfit with a collar vertically adjustably mounted on a threaded rod extending upwardly from the top portion of the target block. The electrode head is telescopically inserted into the sleeve of the target support block and is pivoted until the hooks engage the threaded rod above and below the collar. An anti-rotation or lock pin, movable along its longitudinal axis, is mounted on the vertical adjustment block and is urged by a spring bias to move into a lock aperture formed in the top portion of the target support block when the hooks engage the threaded rod. In the described embodiment, the electrode head target block is mounted on one end of a pivotably mounted arm which has an opposite end biased into engagement with a cam surface so that the electrode head is brought to and away from the link forming mechanism during a portion of each revolution of the cam. When the chain link is formed and in the proper position and with the electrode head moved by the cam into position closely adjacent the link a selected distance therefrom the welding operation is effected. Gas is directed through the electrode head toward the link joint around the electrode which is adjustably spaced inwardly from the end face of the electrode head tip, a high frequency ionization arc is created followed by a low voltage, high amperage weld arc. The cam then causes the electrode head to retract with the face of the electrode head tip brough into contact with a relatively inflexible wiper which shears off any slag which might have been deposited thereon by the previous weld. At the same time, a relatively flexible wiper is biased into wiping contact with the edge formed between the face of the electrode head tip and the peripheral surface of sleeve forming the tip to maintain that edge free of slag.

The automatic chain machines are generally provided with a cam shaft having a plurality of cams mounted thereon for effecting the various link forming operations such as advancing the wire and threading it into the previously formed link, bending the wire into a link, severing the link from the wire strand and closing the link so that the addition of another cam for the electrode head can be easily effected with movement of the electrode head during the dwell period of the threading and severing sequence, which, if necessary can be modified to accomodate the time necessary for the weld sequence. The speed of the automatic chain making machine can be adjusted to vary the weld cycle time and generally will be between 40 to 400 revoluations per minute with the portion of the cycle devoted to for the ionization arc and weld arc requiring only microseconds.

BRIEF DESCRIPTION OF THE DRAWINGS

The details of the invention will be described in connection with the accompanying drawings in which:

FIG. 2 is a side elevation of a welding apparatus made in accordance with the invention set forth in application Ser. No. 229,553 in whith the electrode head is shown in the welding position and also showing a portion of the link forming apparatus;

FIG. 3 is a figure similar to FIG. 2 but with the electrode head in the retracted position;

FIG. 16a showing link holding means, wire strand advancing means, severing means and the tip end of the electrode head; FIG. 16b showing link closing means along with first and second slag wipers; and FIG. 16c showing the tip end of the electrode head in its welding position;

FIG. 23 is a view showing the electrode head mounted in the target adjustment block.

BEST MODE FOR CARRYING OUT THE INVENTION

Figure 1A:
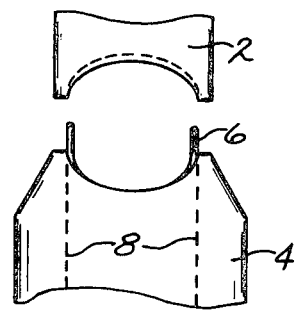
FIGS. 1a, 1b and 1c show a portion of a work piece holder, a camming head and a work piece before, during and after a work piece is formed into a closed link.
Figure 1B:
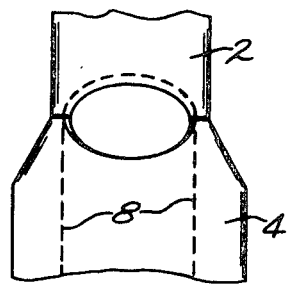
Figure 1C:
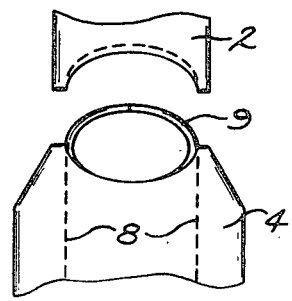

With reference to FIGS. 1a-1c, a conventional link forming device includes a camming head 2 movable rectilinearly in a vertical direction toward and away from a stationary work piece holder 4. A work piece 6 in the form of a metallic wire bent in a generally U-shaped configuration is directed through a passageway indicated by dashed lines 8 and is presented at an opening to the passageway at the top of holder 4 with the bight of the work piece held by holder 4 and with two legs extending upwardly as seen in FIG. 1a. Camming head 2 is then brought down so that a curved surface on the bottom of head 2 contacts the free distal ends of the two legs of work piece 6 and bends them together as seen in FIG. 1b. The ends of the legs can form a butt or bias joint as desired. Camming head 2 is then brought upwardly as seen in FIG. 1c with work piece 6 formed into a link 9 ready for removal from work piece holder 4 so that another U-shaped work piece can be presented for subsequent forming into a link. When in the FIG. 1a position another link, ring or some other finding may be placed over one of the upstanding legs so that it will be captured when the new link is formed.

Figure 4:
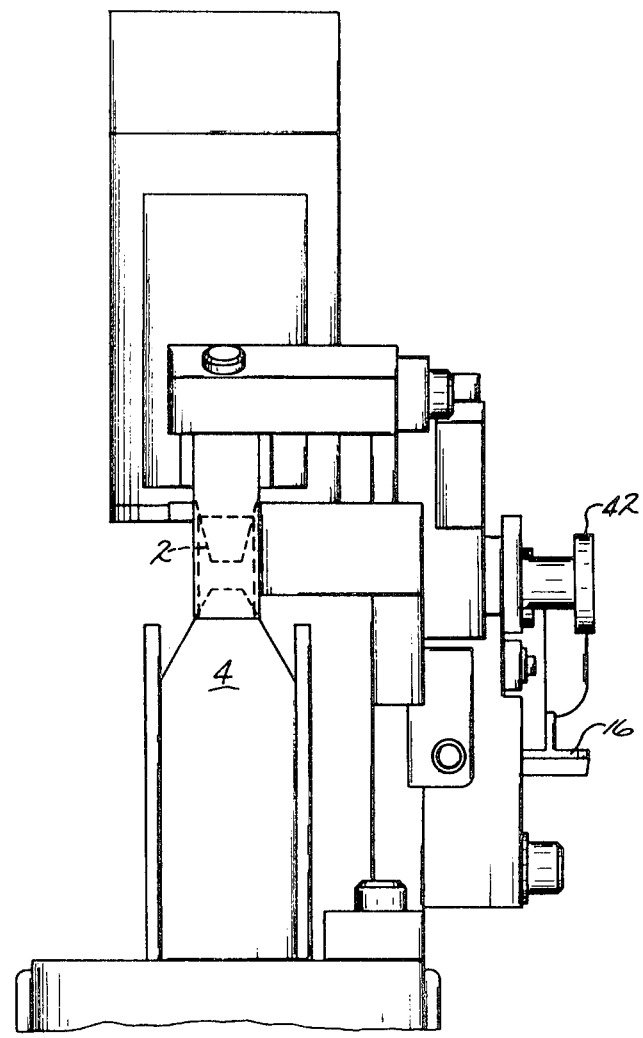
FIG. 4 is a front elevation of the FIG. 2 apparatus.

As seen in FIGS. 2-4, a welding system, generally referred to by numeral 10, comprises a base 12 on which suitable motor means 14, such as a conventional solenoid, is mounted via a generally L-shaped angle iron 16 secured to base 12 by any suitable means, such as bolts 18 shown in the drawings. Core or rod 20 extends from motor 14 and is pivotably connected to link 21 which in turn is pivotably connected at 24 to a bell crank mechanism comprising link 22 pivotably connected to base 12 at 26 and at 30 to one end 28 of an elongated arm 32. The opposite end 34 of arm 32 mounts an electrode assembly 36 to be discussed below. A slot 38 is formed in arm 32 and extends along a portion of its longitudinal axis. A height adjusting eccentric member 40 extends through slot 38 and is rotatably, adjustably connected to base 12 so that turning of member 40 will cause the free distal end 34 of arm 32 to move up or down. Eccentric 40 is preferably provided with an outer, knurrled, cylindrical surface 42, a hub 44 formed concentrically with surface 42 and with screw 46 extending through member 40 and hub 44 received in a threaded bore in plate 48 of base 12. Screw 46 is disposed eccentrically relative to cylindrical surface 42 and hub 44. Hub 44 is received in a bore which extends through block 45. Block 45 is slidingly disposed in groove 38 of arm 32 so that as rod 20 of solenoid 14 moves in and out member 32 will slide on block 45. The entire eccentric is adjustably rotated until the height of end 34 of arm 32 is at the desired position. Although block 45 is shown as a solid member which slides relative to arm 32 within slot 38 it will be appreciated that a roller bearing arrangement can be employed if desired or alternately a porous, self lubricating material can be used for block 45. A block 50 depends from plate 48 of base 12 and mounts an adjustable threaded stop 52 which serves to limit the throw of piston rod 20 by contacting link 22 at 54.

Figures 5, 5A:
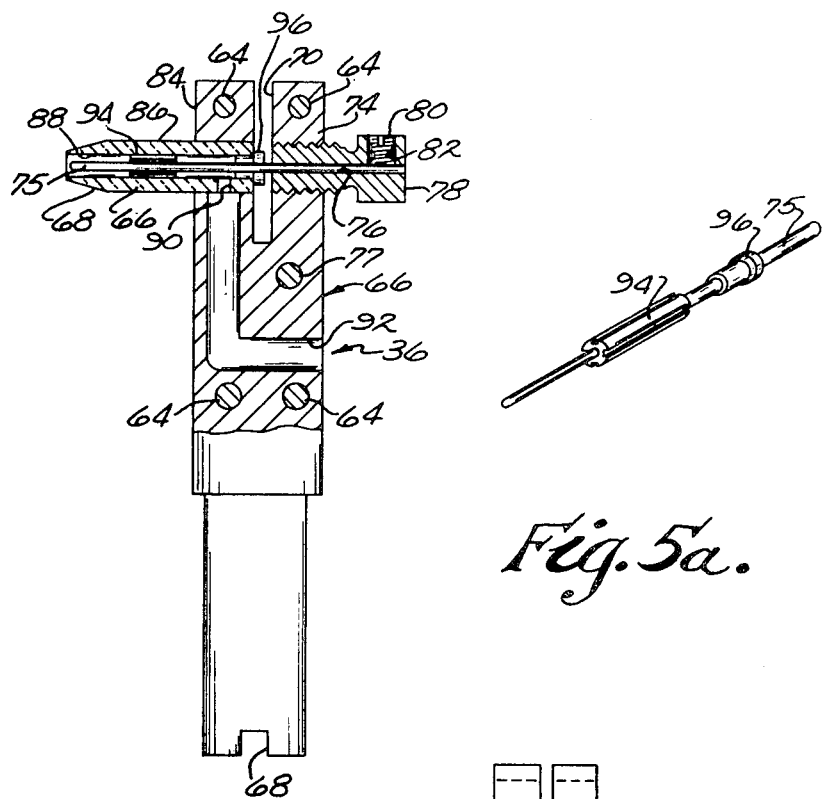
FIG. 5 is an elevational view, partly in cross section, of the welding head shown in FIGS. 2 and 3.
FIG. 5a is a perspective view of the electrode used in the welding head of FIG. 5.
Figure 6:
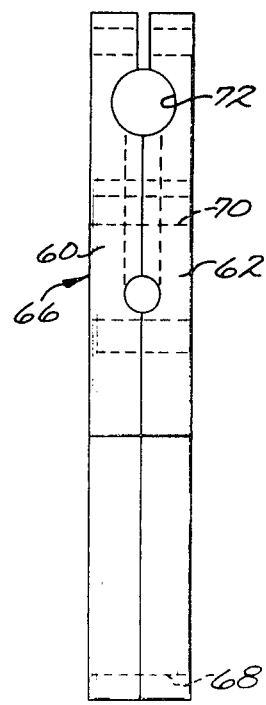
FIG. 6 is a side view of the welding head with the welding rod, welding rod sleeve and welding rod holder removed.

As mentioned above, electrode assembly 36 is mounted at end 34 of arm 32. Arm 32 is bifurcated at 56 and is provided with a seat portion 58 to receive therein assembly 36. A screw 59 extends through the bifurcation and is threaded in the bottom portion to securely fasten assembly 36 between the bifurcation when the screw is tightened. As seen best in FIGS. 5 and 6, electrode assembly 36 comprises opposed members 60 and 62 held together by conventional fasteners 64, such as screws. Members 60, 62 together form a generally cylindrical member 66 formed with a first slot 68 at one end face and a second slot 70 at the opposite end face. Slot 68 is adapted to receive a tool, such as a screwdriver, to permit rotation of assembly 36 within bore 58 of end 34 to provide a selected orientation of the electrode relative to the work piece to be discussed below. Slot 70 extends below a bore 72 formed through member 66 between members 60, 62. Bore 72 is threaded on side 74 of member 66 up to the slot 70. Electrode 75, an elongated rod of tungsten, or some other suitable material, is received within an axially extending bore 76 of threaded member 78. A set screw 80 is received in a bore 82 which intersects bore 76 to secure electrode 75 relative to member 78. Bore 72 extending through side 84 of member 66 on the other side of slot 70, receives a tubular ceramic sleeve element 86. Sleeve 86 has an axially extending bore 88 and has a radially extending bore 90 in communication with bore 88 and in alignment with a passageway 92 formed in member 66. Electrode 75 projects into bore 88 and is maintained centrally disposed therein by means of a splined member 94. Member 94 is splined in order to permit gas to flow from passageway 92 through sleeve 86 and out through the open end of the sleeve. A suitable plug 96 closes the other end of sleeve 86 preventing gas flow out through slot 70. Rotation of threaded member 78 provides adjustment of electrode 75 along the longitudinal axis of sleeve 86 so that the free distal end of electrode 75 can be disposed a selected distance from the mouth of sleeve 86. Preferably the outer tip portion of sleeve 86 is tapered to facilitate adjustment of the distal end of electrode 75 relative to the work piece as will be explained below. Electrical connection is made to electrode 75 through screw 77, member 66 and member 78.

With particular reference to FIGS. 2 and 3, a camming surface 98 is shown fixedly attached to arm 32 and is adapted to cooperate with a cam roller 100 mounted on a shield arm 102. Shield arm 102 is pivotably attached to plate 48 at 104. The opposite end of shield arm 102 mounts a shield 106 adjustably attached to arm 102 at 108 so that its orientation can be adjusted relative to the work piece. Shield 106 is formed with a recess 110 so that it can more completely encompass the welding area as seen in FIG. 2. As seen in that figure the position of the shield is determined by the location of camming surface 98 relative to cam roller 100. When arm 32 is retracted to the FIG. 3 position camming surface 98 moves to the right as seen in the figure causing cam roller 100 to ride up and therefore forcing shield 106 upwardly away from the work station.

In its at-rest original position the apparatus is in the FIG. 3 position (also FIG. 1a) with the free ends of work piece 6 extending upwardly from work piece holder 4. Typically a link is placed over one end of work piece 6 for attachment thereto. A cycle is initiated by an operator depressing a suitable switch, such as a foot switch. A description in greater detail of the controls for effecting the operation of the machine will be given infra, however, upon initiation of the cycle, head 2 descends forming work piece 6 into a closed loop or link 9 with the ends forming a butt or bias cut joint as desired. The electrode head assembly is then brought forward to the FIG. 2 position and a gas valve opened so that gas flows through tube 93 to passageway 92 and bore 98. Camming surface 90 moves forward with the head assembly allowing shield 106 to descend to the work piece 9 to shield the weld area from the operator. The forward movement of arm 32 is limited by link 22 engaging stop 54. This stop is adjustably located so that the other distal end tip of ceramic sleeve 86 just contacts the work piece as seen in FIG. 2. When sleeve 86 is thus in contact with the work piece the distal end of electrode 75 is spaced from the work piece a selected distance, generally in the range of 0.001 to 0.090 inch depending on the material and configuration of the work piece. The gap between the electrode and the work piece is ionized by high voltage means such as an arc generator and when suitably ionized a welding arc from suitable energy means such as a capacitor bank jumps from the end of electrode 75 to the work piece which, through work piece holder 4 forms another electrode. The electrode head assembly is then retracted to the FIG. 3 position and the welded work piece ejected from holder 4 with a new work piece presented. The entire cycle takes in the order of a second or less to complete.

Figure 9:
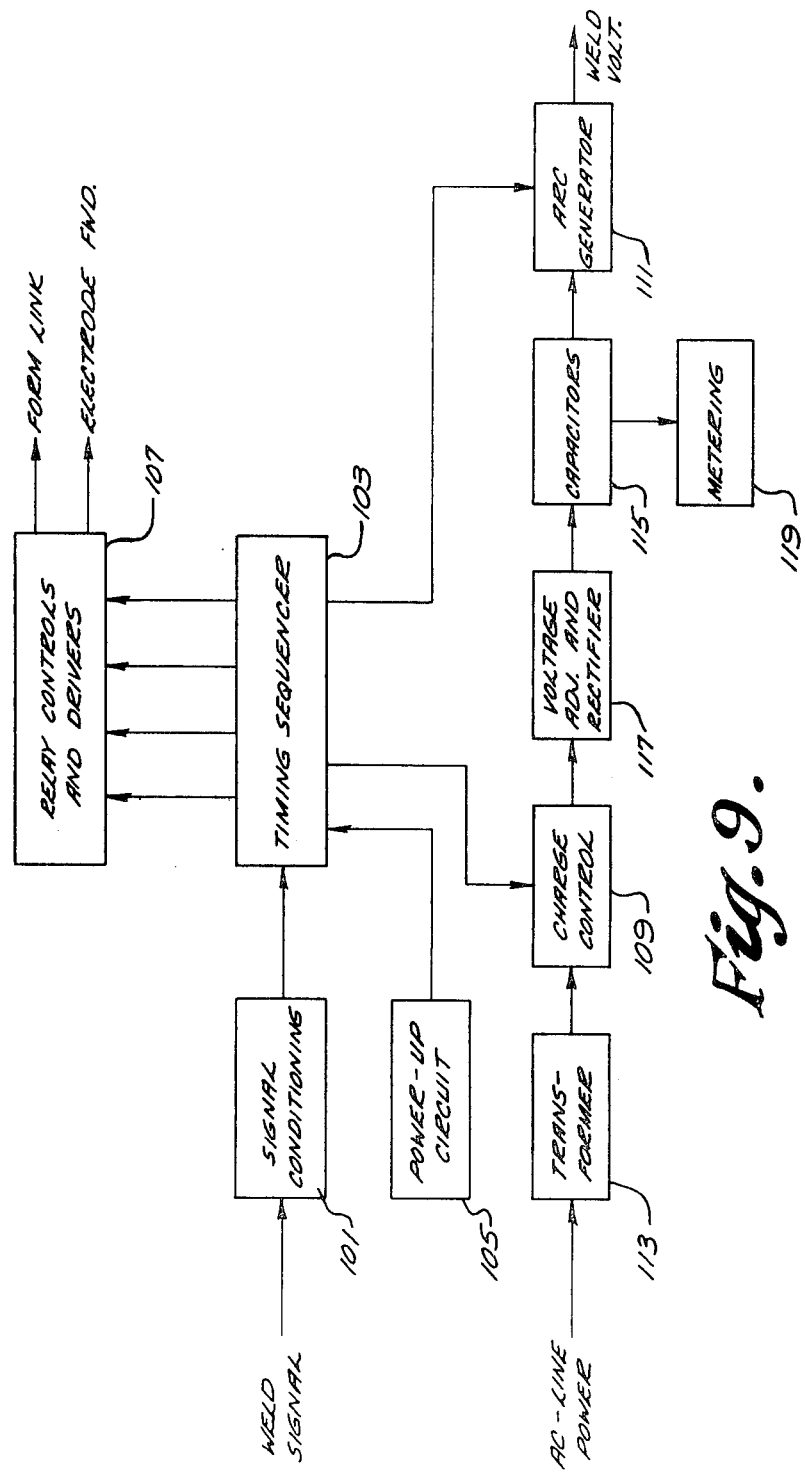
FIG. 9 depicts a functional block diagram of the electrical controls of the disclosed apparatus.

With reference to FIG. 9 the electrical controls of the welding apparatus are shown in a functional block diagram. The weld signal initiated by the operator depressing a foot switch activates timing sequence, circuit portion 103 through signal conditioning circuit portion 101. The timing sequencer 103, powered by circuit portion 105, provides signals to a relay controls and driver circuit portion 107 as well as to charge control circuit portion 109 and are generator circuit portion 111. A transformer 113 transforms standard AC line voltage to provide powder for power up circuit portion 105 as well as for capacitor circuit portion 115 and arc generator circuit portion 111. Circuit portion 117 provides voltage adjustment and rectification for the power supplied to circuit portions 115 and 111. A meter 119 may be used to provide an indication of the capacitor charge voltage.

Figure 8:
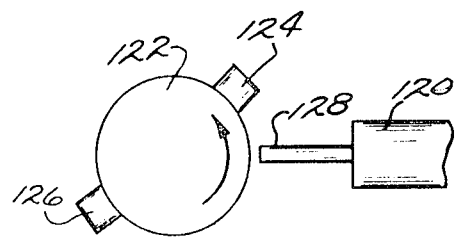
FIG. 8 is a partial view of a clutch and clutch solenoid used to control the link manufacturing cycle.
Figure 10:
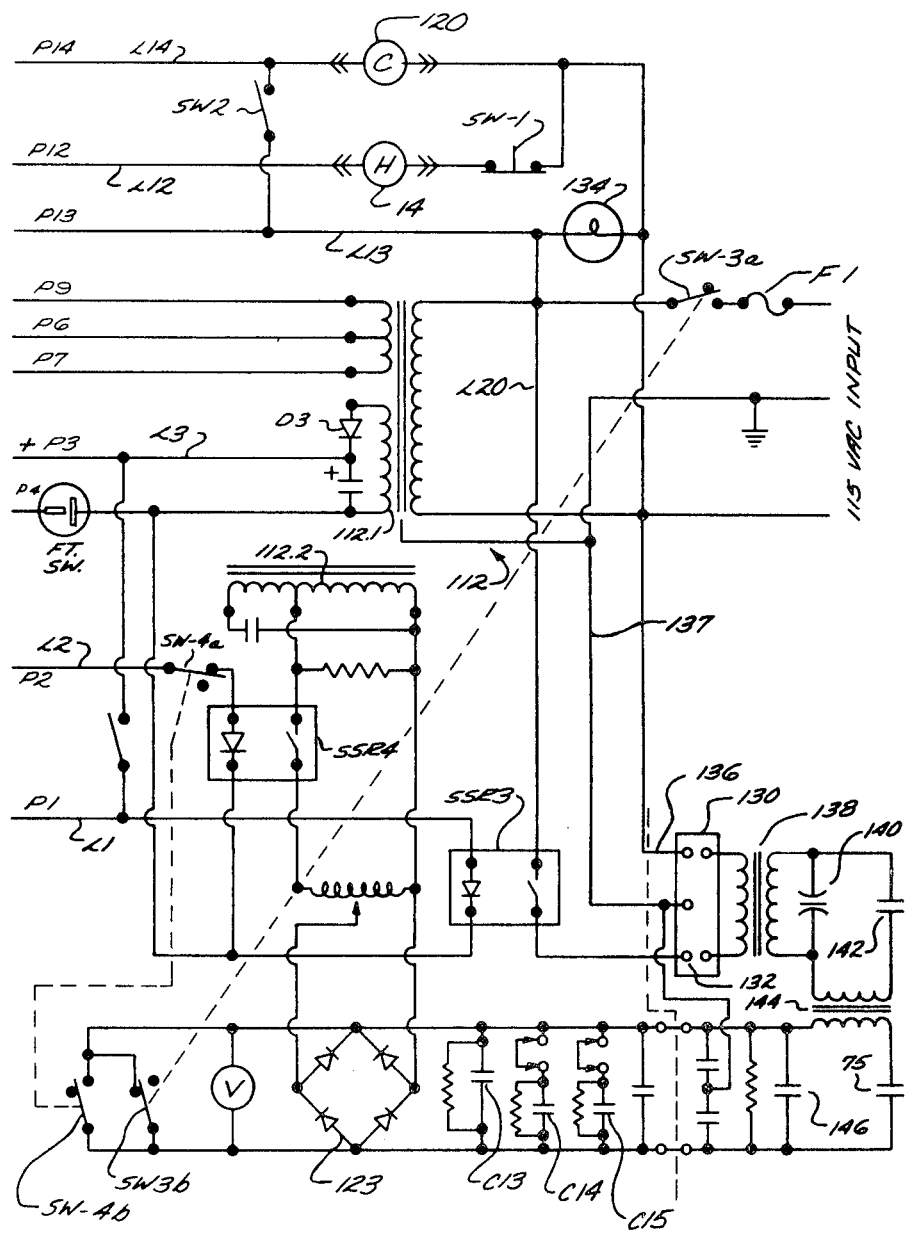
FIG. 10 is a schematic wiring diagram of a portion of the electrical controls used in connection with the above apparatus.
Figure 11A:
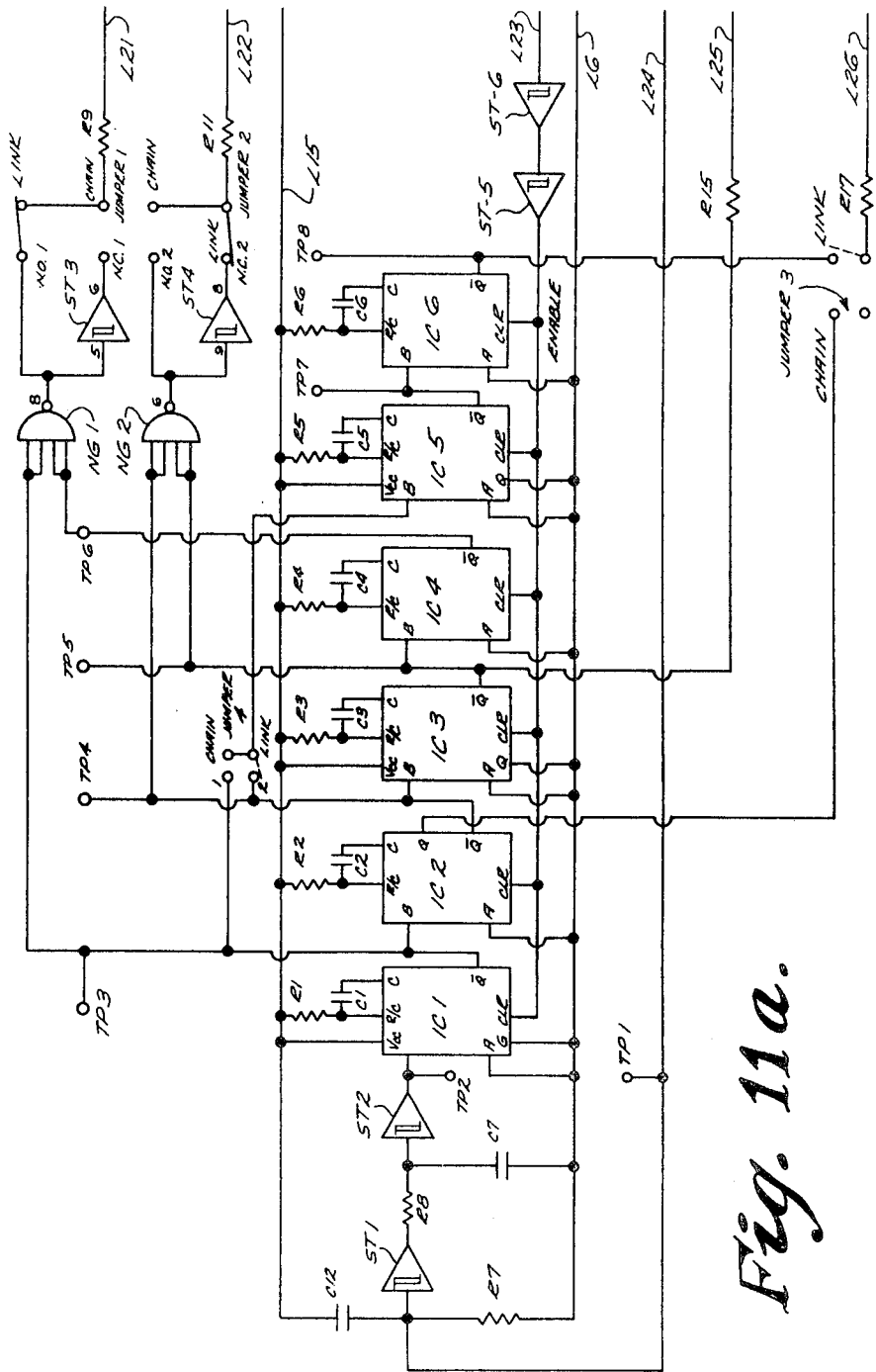
FIGS. 11a and 11b taken together are a schematic wiring diagram of the sequential control means controlling the operation of the various steps in manufacturing a link.
Figure 11B:
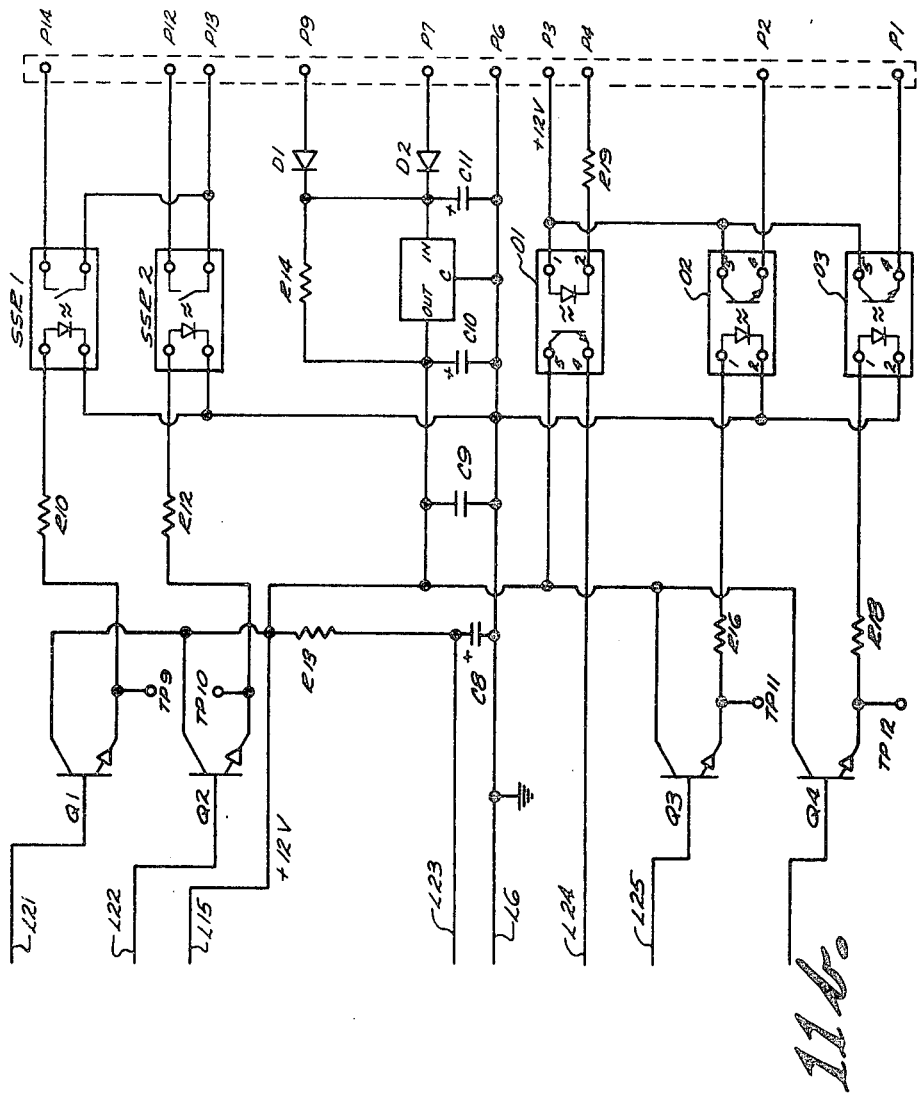
Figure 12:
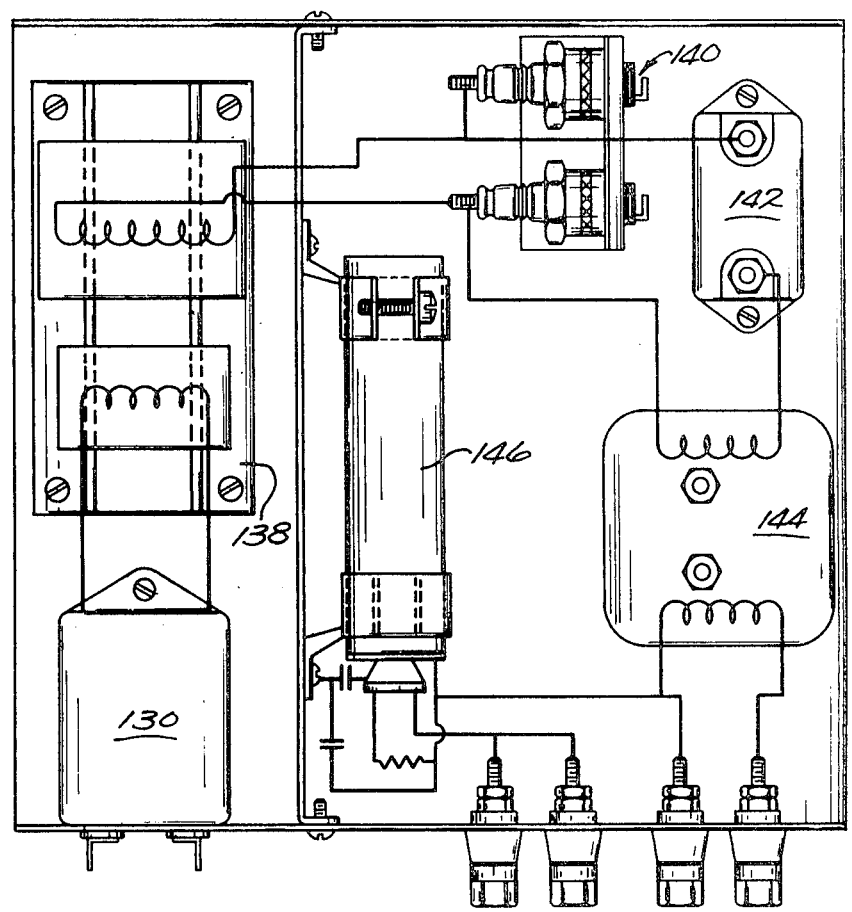
FIG. 12 is a wiring diagram of a portion of FIG. 10 used to produce an ionizing arc.

More specifically, with reference to FIGS. 10, 11a and 11b, a plurality of timers IC1-IC6, which in one system made in accordance with the invention comprise six conventional monostable multivibrators, are connected between ground, line L6, and a twelve volt supply line L15. As mentioned above, FIGS. 11a and 11b together make up the schematic of the timing circuit used in the invention. It will be noted that lines L6, L15 and L21-L26 of FIGS. 11a and 11b interconnect with one another. A conventional foot switch FT SW (FIG. 10) is connected between pin P4 and secondary 112.1 of transformer 112. The other side of secondary 112.1 is connected through a diode D3 to line L3 connected to pin P3 and a capacitor to side 112.1 of the secondary. When the foot switch FT SW is closed a plus twelve volts turns on optical isolator O1 (FIG. 11b) which brings twelve volts into monostable multivibrator, timer IC1. The wave form is conditioned by Schmitt triggers ST1, ST2 to effect the proper transition and rise time to properly trigger IC1. The output $\overline{Q}$ of IC1 is normally high (plus twelve volts) but when triggered by the signal through the Schmitt triggers ST1, ST2, the output $\overline{Q}$ goes low and causes the output of NAND gate NG-1 to go high and turn on transistor Q1 which in turn actuates solid state relay SSR1 closing the output contacts which are connected to pins P13, P14. Line L13, connected to pin P13, (see FIG. 10) is connected to 115VAC. Line L14 is connected to a clutch solenoid 120 also seen in FIG. 8. Clutch 122 is provided with stop projections 124, 126 which are adapted to abut plunger 128 when it is in its outer or protracted position. Closing of the contacts of solid state relay SSR1 activates solenoid 120 retracting plunger 128 for a brief period of time determined by the timing constant of timer IC1, R1C1, allowing stop 124 to pass by plunger 128 and clutch 122 to rotate approximately half of a turn until stop 126 comes into abutment with the plunger which by that time has returned to the protracted position. During this half turn, head 2 (see FIGS. 1a–1c) descends bending legs 6 of the work piece to form a closed link and ascends to the FIG. 1c position.

When the output of timer IC1 turns high again, determined by the time constant of R1,C1, timer IC2 is triggered and its output $\overline{Q}$ goes from a normally high to a low turning the output of NAND gate NG2 to the high voltage state which is inverted by Schmitt tirgger ST4 to turn off the conductive transistor Q2 and open the closed solid state relay SSR2. Thus Line L12, connected to the electrode head solenoid 14 is deenergized and plunger 20 allowed to go to the protracted position by means of a spring bias (not shown) causing the electrode head to move toward the work piece and after the time determined by R2,C2 triggers timers IC5 and IC3. Line L12 is also connected to the gas solenoid and is turned on by R2,C2 signal. The output of timer IC5, $\overline{Q}$, having a time constant determined by R5,C5 turns on timer IC6, again having an output which goes from normally high to a low for a period of time determined by R6,C6. The output of timer IC6 turns on transistor Q4 permitting current to pass through a light emitting diode in isolator C3 thereby connecting pin P1 with 12 volts of pin P3. As seen in FIG. 10, line L1, connected to pin P1 will then energize solid state relay SSR3 so that input 132 of RFI generator 130 is connected to line L20 which is connected to 115 volt alternating current power source through an on-off switch SW-3a and a fuse F1. Line 136 is connected to the other side of the 115 volt AC power source with line 137 connected to ground. Thus the output of timer IC6 energizes the ionization arc by energizing RFI generator 130. The RFI generator energizes transformer 138 which generates a high voltage across air gaps 140 and the series combination of capacitor 142 and coupling transformer 144. As the transformer 138 voltage rises, air gaps 140 ionize, thus discharging capacitor 142 across coupling transformer 144. The coupling transformer secondary is connected in series with capacitor C13–C15 DC voltage. Capacitor 146 prevents voltage from the secondary from being fed to capacitors C13–C15. The combination of charge and discharge on transformer 138, air gap 140 and capacitor 142 occurs at a high rate, producing an effectively continuous high voltage superimposed on the capacitor C13–C15 DC voltage.

The output $\overline{Q}$ of timer IC3 is normally high. When it turns low the signal goes to the NAND gate NG2, timer IC4 and transistor Q3. Since the output of timer IC3 is normally high transistor Q3 is normally conductive causing optical isolator O2 to conduct and concomitantly solid state relay SSR4 in line L2 to close. When relay SSR4 is closed winding 112.2 of transformer 112 is energized and rectified by diode rectifier 123 through an adjustable transformer winding 112.4. This rectified direct current is then delivered to capacitors C13, C14, C15 which provide the welding arc. As shown in FIG. 10, all three capacitors are connected in the charging circuit, however, depending upon the level of charge desired, two are shown as being disconnectable. Any selected number of capacitors, of course, can be used as desired. The energy in the welding arc can be expressed in Joules where $J = \frac{1}{2} CV^2$ with C=farads and V=volts. The preferred range is between 1 and 160 Joules.

Once the $\overline{Q}$ signal from timer IC3 goes low and transistor Q3 turns off then the charging of capacitors C13–C15 is terminated.

The $\overline{Q}$ signal from timer IC3, as mentioned above, also is delivered to timer IC4. This causes another signal to be given to NAND gate NG1 retracting the clutch solenoid to permit the completion of the cycle.

Figure 13:
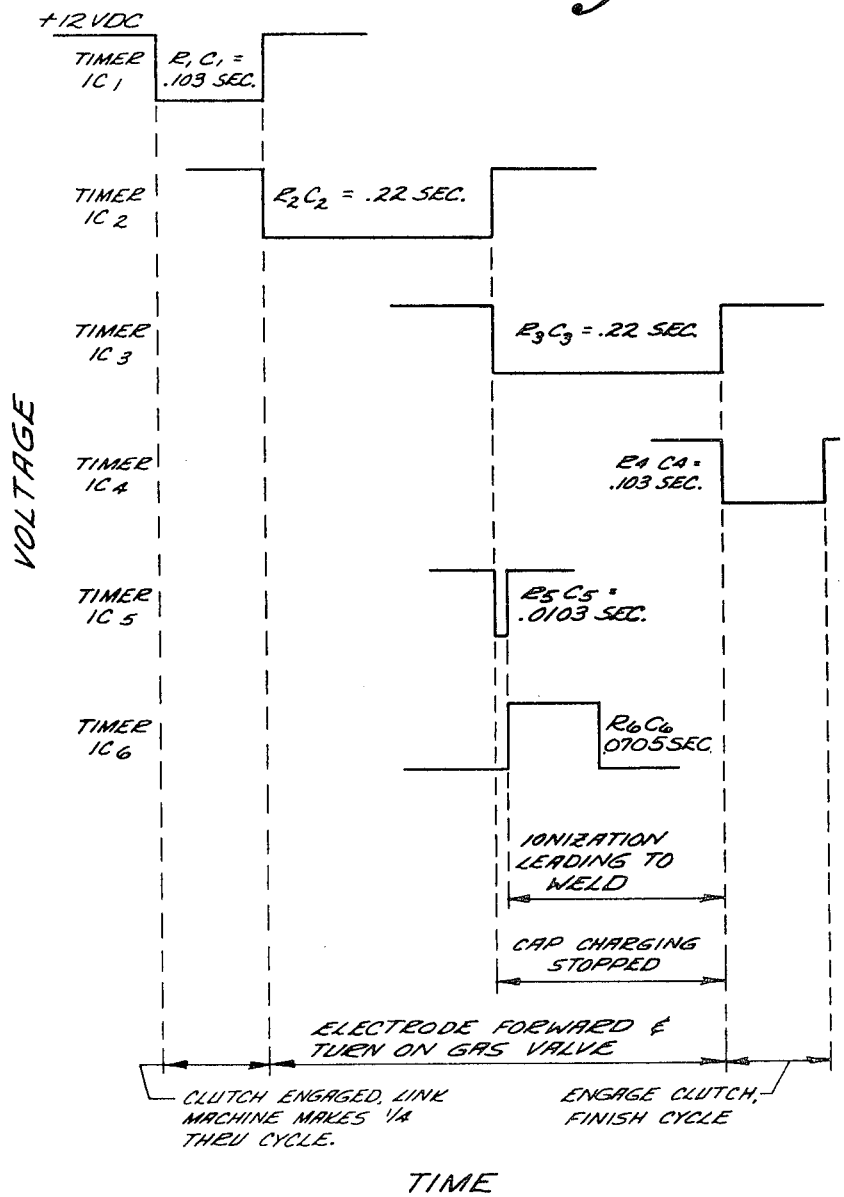
FIG. 13 shows the timing sequence of the FIGS. 11a, 11b control means.
Figure 14:
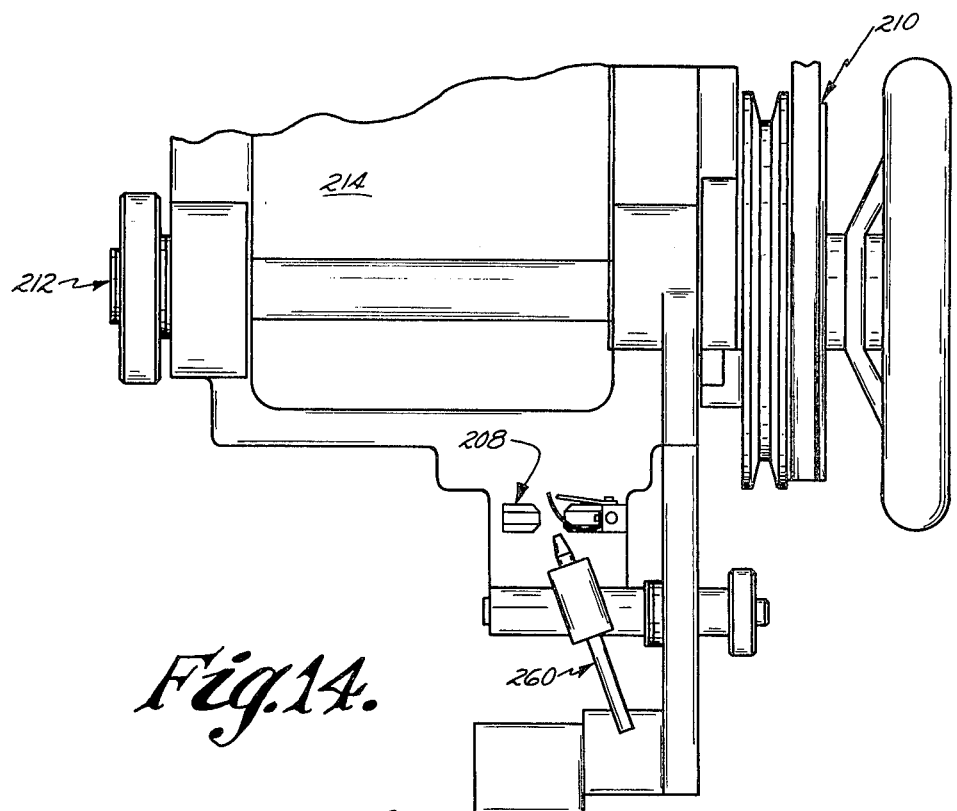
FIGS. 14 and 15 show a conventional automatic chain machine modified to include an electrode head and support means made in accordance with the invention.
Figure 15:
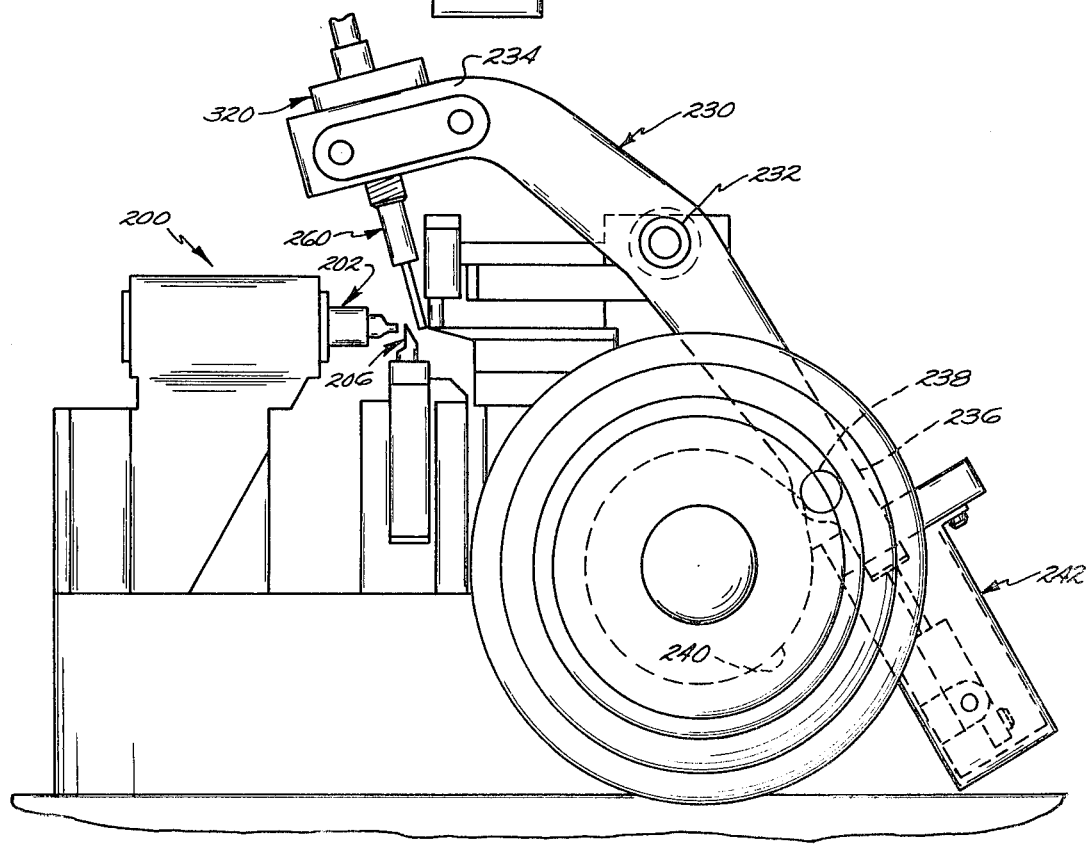

The timing sequence of timers IC1-6 is shown in FIG. 13 with the function controlled indicated below the corresponding signal. Timer IC1 causes the clutch to make a partial cycle forming a link and initiates operation of timer IC2. Timer IC2 causes the electrode head to move forward and turns on the gas valve and initiates operation of timers IC3 and IC5. Timer IC5 initiates operation of timer IC6 which actuates the ionization means. Charging of the capacitor C13–C15 occurs during the timer IC3 signal determined by R3, C3. Finally the clutch is engaged during the timer IC4 signal to finish the cycle with the electrode head returning to the retracted position.

Figure 7:
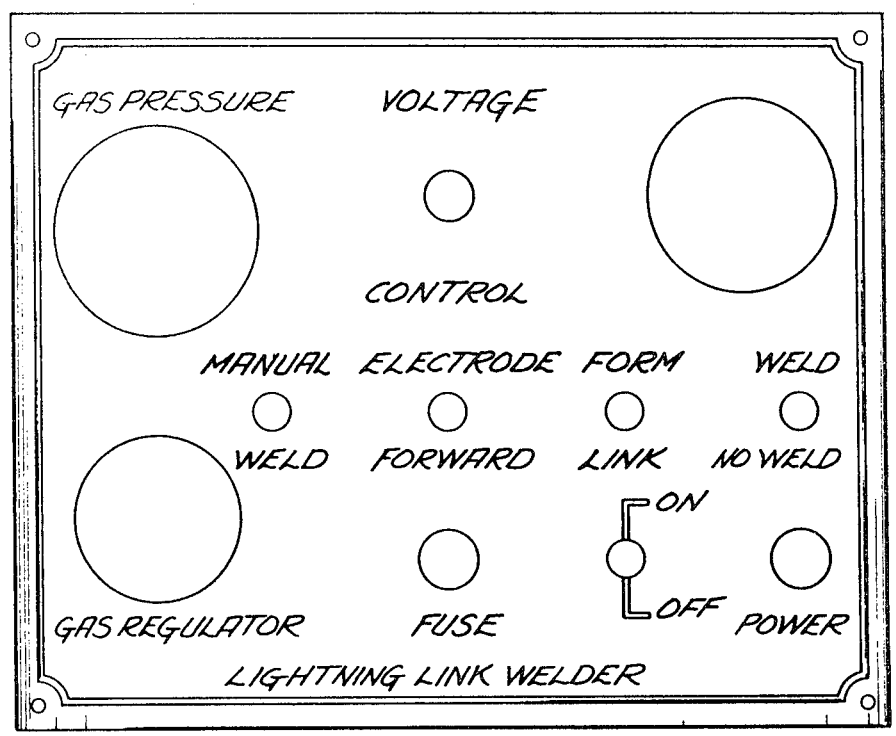
FIG. 7 is an elevational view of the control panel used with the apparatus of the invention set forth in the aforementioned application.

With reference to FIGS. 7 and 10, several switches are shown which permit operation of certain portions of the apparatus without going through the entire cycle. Switch SW1 controls the position of electrode head 36. As mentioned above the electrode head solenoid is normally actuated when the machine is energized keeping head 36 retracted. The signal from timer IC2 interrupts the triggering of transistor Q2 and turns it off which causes relay SSR2 to open and deenergizes solenoid 14 to allow head 36 to move to its protracted position. Opening the normally closed switch SW-1 has the same effect since it opens line L12 which is connected to solenoid 14. Thus if it is desired to bring the head forward it can be accomplished without going through the rest of the cycle.

Clutch 122 can be engaged by closing switch SW-2 which connects the clutch solenoid 120 in line L14 to the power source via line L13.

Switch SW-3 is a double pole, double throw switch so that when switch SW-3a is closed for normal operation switch SW-3b is in the open position preventing discharge of capacitors C13–C15 except through the electrodes, however, when switch SW-3a is opened to turn off the apparatus, (as shown in the drawings) switch SW-3b is closed to permit capacitors C13–C15 to discharge.

Switch SW-4 is also a two-pole, double throw switch. When switch SW-4a is closed and the device is cycled, welding will occur, switch SW-4b being opened and having no effect on the welding capacitors. However, if switch SW-4a is opened the charging of the capacitors C13–C15 is interrupted by maintaining relay SSR4 open and by permitting discharge of the of the capacitors with switch SW-4b closed.

Jumpers 1–4 are provided to allow alternate operations by connecting as shown in the schematic (ie., connected for "link" operation) or alternatively for "chain" operation. Also shown in FIGS. 11a, 11b are a plurality of test points TP1–TP12 which are used to facilitate testing of the circuit.

In a device made in accordance with the invention, the following were employed:

| | | | | | | |
|---|---|---|---|---|---|---|
| SSR1, SSR2 | | S 30 12A (2 devices) | | | | |
| SSR3, SSR4 | | S 21 8A (2 devices) | | | | |
| IC1-16 | | MM74C22IN (3 devices) | | | | |
| ST1-6 | | MM74C14N (1 device) | | | | |
| NG1, NG2 | | MM74C20N (1 device) | | | | |
| | | LM342P-12 | | | | |
| 01-3 | | H11A1 | | | | |
| Q1-4 | | MPSA06 | | | | |
| D1, D2 | | IN4003 | | | | |
| C13-C15 | | GE 86F169M (15600 uf) | | | | |
| 130 | | EMI Filter IRI 1A | | | | |
| | | 115/250 V 50-400 HZ | | | | |
| | | | | μf | | μf |
| R1 | 220K | R11 | 15K | C1 .47 | C8 | 3.3 |
| R2 | 470K | R12 | 1K | C2 .47 | C9 | Not Used |
| R3 | 470K | R13 | 220K | C3 .47 | C10 | 35 |
| R4 | 220K | R14 | Not Used | C4 .47 | C11 | 100 |
| R5 | 470K | R15 | 15K | C5 .022 | C12 | .22 |
| R6 | 150K | R16 | 1K | C6 .47 | | |
| R7 | 100K | R17 | 15K | C7 .022 | | |
| R8 | 470K | R18 | 1K | | | |
| R9 | 15K | R19 | 1K | | | |
| R10 | 1K | | | | | |

Voltmeter 118 referenced above with reference to FIG. 9 is seen in FIG. 10 connected across capacitors C13–C15.

Visual indicating means 134 is placed across the 115 volt power source beyond switch SW-3 to give an indication of when the welding apparatus is energized.

With reference to FIGS. 14, 15 and 16a–16c, a conventional automatic chain making apparatus 200 is shown which has been modified to include electrode head 260 mounted adjacent to a chain link forming mechanism. Apparatus 200 includes wire holding clamping means 202, wire strand feed means 204, wire severing means 206, and link closing means 208. A drive sheave 210 transmits rotational motion to cam shaft 212 on which a plurality of cams are mounted in sequential operation control portion 214. As cam shaft 212 is rotated by drive 210 the operating elements of the chain making apparatus arc caused to act on wire 214 as indicated schematically in FIGS. 16a–16c.

A supporting arm 230 is pivotably mounted intermediate its end on apparatus 200 at 232 and has a first electrode head supporting end 234 and a second cam follower supporting end 236. Cam follower 238 is formed on end 236 and is maintained biased against cam 240 by an adjustable brasing mechanism 242.

Electrode head 260 mounted at end 234 of arm 230 comprises an elongated tubular, cylindrical sleeve 262 of electrically insulative material such as Vespel, a high temperature synthetic dielectric material of E. I. DuPont de Newmours. A wire electrode 264 of tungsten, molybdenum or other suitable material is telescopically received within sleeve 262 and is attached to screw member 266 which is received in a threaded bore 268 so that rotation of member 266 will cause movement of electrode 264 along its longitudinal axis and the longitudinal axis of sleeve 262 so that the position of free distal end 270 of electrode 264 can be adjusted relative to face 272 of end tip 274, an electrically insulating sleeve, preferably of a ceramic material which is mounted to sleeve 262. A gas port 276 is attached to sleeve 262 so that a selected gas medium can be provided to flow around electrode end 270.

A vertical adjustment support block 290 has a bore 292 extending therethrough which receives sleeve 262 of electrode head 260. Block 290 has a pair of hooks 294, 296 extending laterally from the block and split tabs 298, 300 which cooperate with screw 302 to fix block 290 to sleeve 262. Block 290 is provided with bore 304 which extends in a direction generally parallel to bore 292 and receives therein an anti rotation or locking pin 306 which projects through both the top and bottom ends of block 290. A collar 308 limits movement of pin 306 toward the bottom of block 290 while spring 310 places a bias on collar 308 in that direction. Plate 312 serves as a surface against which spring 310 reacts. End 314 of pin 316 is adapted to be received in a locking aperture to be described below while end 316 can be grasped and moved upwardly against the bias of spring 310 to remove end 314 from the locking aperture.

Attached to end 234 of arm 230 at 318 is a target adjusting block 320 comprising a top portion 322 and a bottom portion 324. The two portions have contiguous generally planer surfaces 326, 328 respectively on which the portions are slidable relative to one another. Top portion 322 has a bracket 330 fixedly attached thereto by fasteners 332. Bracket 330 is formed with parallel extending bars 334, 336 with a slot 338 formed in bar 336 and a similar slot (not shown) in bar 334. A threaded rod 340 is fixedly attached to bottom portions 324 and projects outwardly through slot 338. A thumb wheel 342 is threadedly disposed on rod 340 intermediate bars 334, 336 so that upon rotation of thumb wheel 342 force will be transferred to bar 334 or 336 causing movement of top portion 322 relative to bottom portion 324 in a direction parallel to the longitudinal axis of rod 340 (i.e., in an x direction)

A bracket 350 is fixedly attached to bottom portion 324 and is provided with a pair of parallel extending bars 352, 354. A threaded rod 356 projects outwardly through bottom portion 324 but is attached to top portions 322 interiorly of block 330 as indicated by the dashed lines in FIG. 21. A thumb wheel 358 is threaded on rod 356 so that upon rotation of thumb wheel 358 top portion 322 is moved relative to top portion 324 in a direction parallel to the longitudinal axis of rod 356 (i.e., in a y direction).

Block 320 is formed with a bore extending therethrough from top to bottom and receives therein an electrode head receiving sleeve 364. Sleeve 364 is fixedly attached to top portion 322 and extends through an enlarged aperture in bottom surface 362. A nut 363 is received on the bottom portion of sleeve 364 and is tightened against surface 362 to obtain the desired resistance of movement of portions 322, 324 relative to one another. A top portion 322 is moved relative to bottom portion 324 the longitudinal axis of sleeve 364 is moved in an x or y direction so that very precise adjustment of the position of electrode head 260 relative to the work piece is effected.

Figure 21:
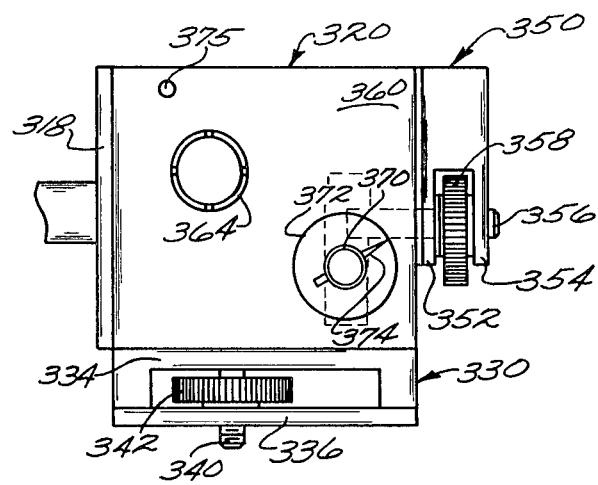
Figure 22:
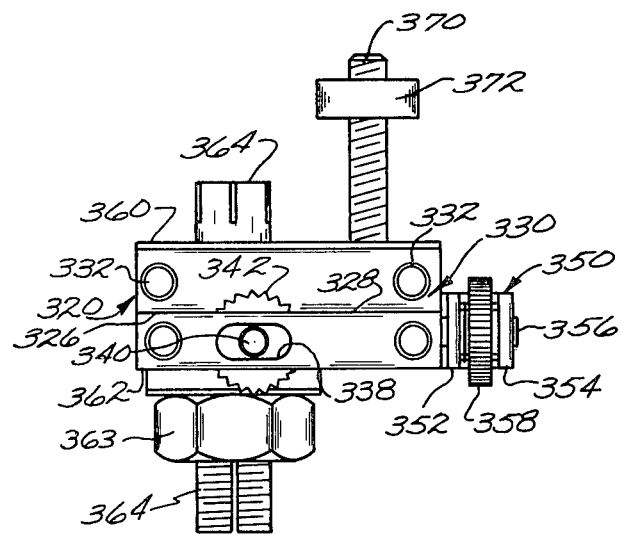

A threaded rod 370 extends upwardly from top surface 360 of block 320 and is provided with a threaded collar 372 which can be moved along the longitudinal axis of rod 370 until it is at a selected, adjustable distance from surface 360. As seen in FIG. 21 collar 372 is split at 374 so that it can be tightened onto the rod to fix its position by a conventional screw fastener (not shown). As best seen in FIG. 23 electrode head 260 is inserted into sleeve 364 and is then pivoted so that hooks 294, 296 will respectively engage rod 370 above and below collar 372. If will be seen that as the position of collar 372 is changed the vertical position of electrode head 360 is concomitantly changed. Lock pin 306 is adapted to slide into lock aperture 375 formed in top surface 360 as electrode head 260 is pivoted into the position that hooks 294, 296 engage rod 370 so that the electrode head is held securely in a selected adjusted position. The electrode head can be removed from target adjustment block 320 by pulling up on end 316 of pin 306 to remove end 314 from aperture 375 and then pivoting the electrode head counter clockwise as viewed from FIG. 21 to release hooks 294, 296 from rod 370. Head 260 can then be removed by lifting it from sleeve 364.

Figure 16A:
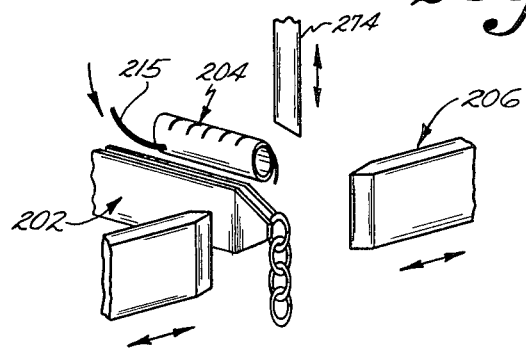
FIGS. 16a, 16b and 16c show a portion of the FIGS. 14 and 15 apparatus in perspective.
Figure 16B:
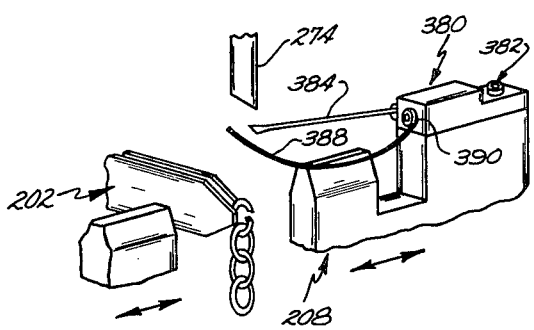

Apparatus 200, as schematically indicated in FIGS. 16a and 16b form a chain in a conventional manner under the control of cams in control portion 214 by repeating cycles of operations including advancing wire strand 215, clamping the wire strand with clamping jaws 202, forming, twisting, threading and severing sequentially. During a portion of each cycle of operation electrode head tip 274 is brought closely adjacent the newly formed link, still held in jaws 202 with the link joint exposed to the end 270 of electrode 264 through a window formed by face 272. Generally, approximately five degrees of one revolution is required to effect the weld operation. This dwell is either already available in existing chain making machines for the threading operation or can be lengthened by elongating the respective cam flat for the interval during which the threading operation is performed. When the link is appropriately clamped in jaws 202 with the joint between the two ends of the link exposed electrode head 260 is brought adjacent to the link at a selected distance therefrom by cam mechanisms 238, 240. It will be understood that other mechanisms can be used, if desired, to move electrode head 260, such as a solenoid, pneumatic cylinder and so on. Further, it will be appreciated that in certain chain making machines the electrode head may be held stationary at a location adjacent a portion of a path followed by the clamming jaws during the link forming operation. In any event, the link joint and the electrode are placed relative to one another a preselected distance for sufficient time to create an ionizing, high frequency arc followed by a low voltage, high amperage welding arc. The signal to begin the weld cycle can conveniently be initiated by the same camming device that moves the electrode head (or clamping jaws) or by any other conventional means to effect the required timing.

Figure 16C:
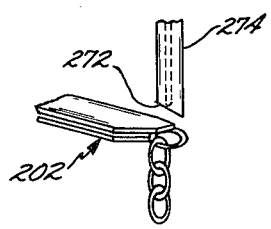
Figure 17:
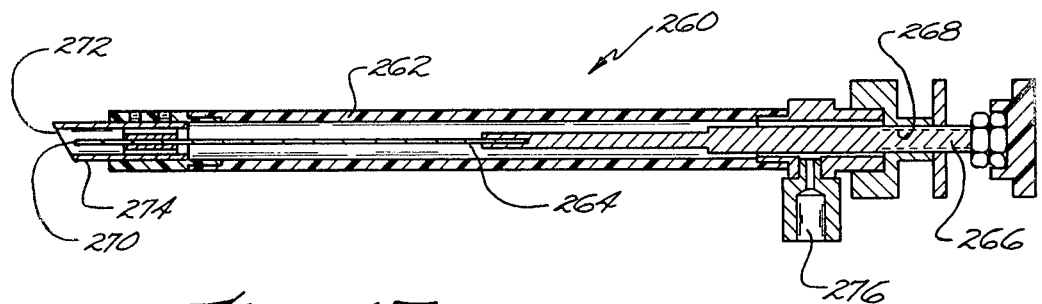
FIG. 17 shows a cross sectional view of the welding head.
Figure 18:
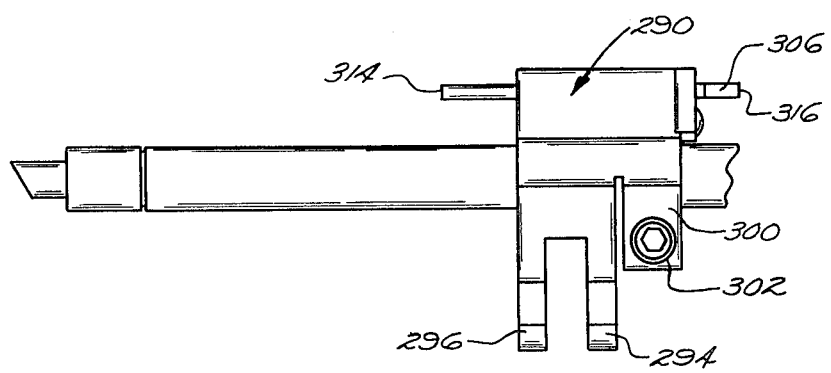
FIG. 18 is a plan view of the FIG. 17 head with the addition of a vertical adjustment block.
Figure 19:
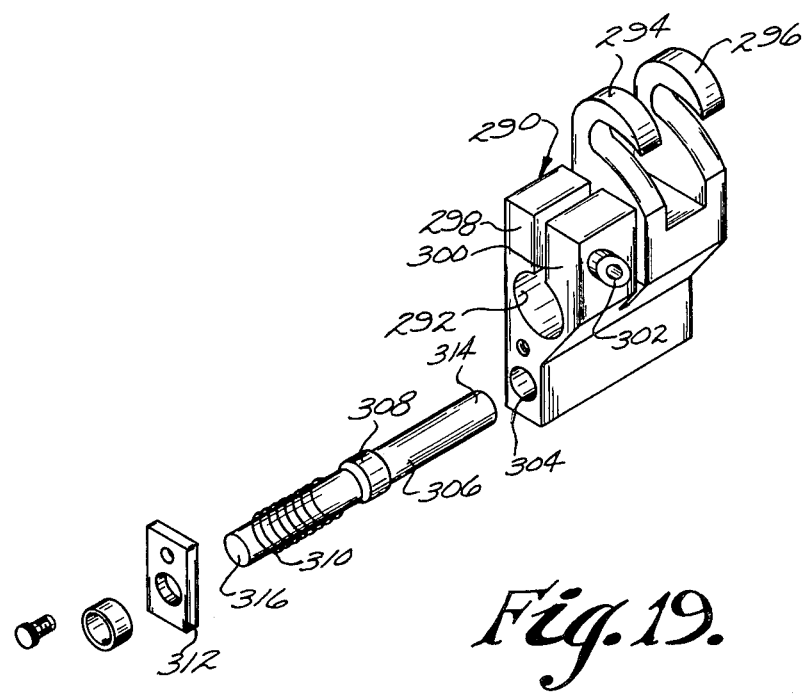
FIG. 19 is a perspective view of the vertical adjustment block of FIG. 18 including an exploded view of an anti-rotation pin.
Figure 20:
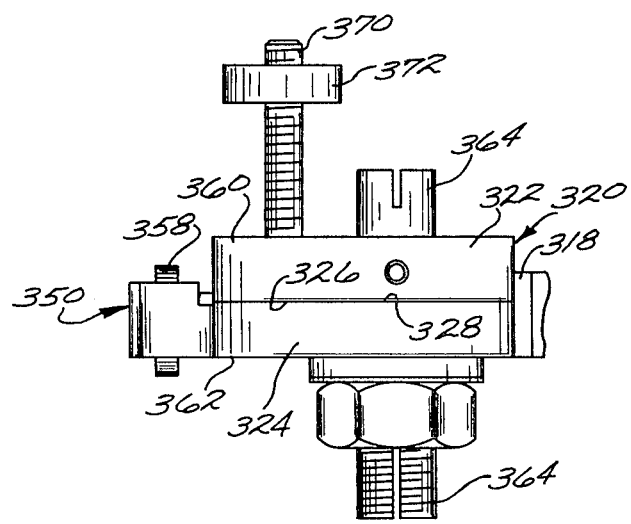
FIGS. 20-22 are front, top and side views respectively of the target adjustment block.

Electrode head tip 274 with electrode 264 spaced therewithin serves to direct the arc and its concomitant heat at the target and thereby concentrates and confines the weld heat at the point of the weld. Tip 274 also serves to direct the ionizing pre arc and the gas flow to the targeted link joint. Tip 274 can be moved toward or away from the link joint by means of the targeting adjustment block 320 and vertical adjustment block 290 thereby effecting some control of the weld and electrode 264 can be moved longitudinally within head 260 by screw means 266. These adjustments make the weld smaller or wider and effect the weld penetration as described. Further, tip 274 is formed with a bias cut providing face 272 which, as best seen in FIG. 16c concentrates the arcs and gas flow around the joint. After the weld occurs, the electrode head tip is wiped to prevent buildup of any slag. As seen in FIG. 16b a wiper support 380 is mounted on one of the anvil members 208 which are adapted to reciprocate back and forth to close the chain link. A conventional fastener 382 permits angular adjustment of support 380 to obtain the desired orientation of the wipers relative to tip 274. A first relatively inflexible wiper 384 is mounted on a side of support 380 by a conventional fastener 386 and its position adjusted so that it slices across face 272 of electrode head tip 274 as the anvil member 208 approach a link held in jaws 202. A second relatively flexible wiper 388 is fixed to support 380 by fastener 390 and is adapted to rub across the edge formed between face 272 of tip 274 and the outer peripheral surface of the cylindrical sleeve tip 274 to maintain the edge free of slag buildup. Wiper 388 is placed in such a position that tip 274 pushes it out of the way as the wiper moves by the tip to obtain the desired rubbing action. It will be understood that the wipers can be mounted in other ways as long as the same relative motion between the wipers and tip is obtained.

Thus, pursuant to this invention, a compact yet accurate support means positions the electrode head at a selected position adjacent chain links as they are formed in an automatic chain making apparatus so that a high voltage pre arc, several times that of normal welding voltage, is produced to ionize the atmosphere between an electrode and the link. The pre arc in combination with the selected gas employed, i.e., argon, nitrogen, helium or mixtures thereof, lasts for a very short period of time, in the order of micro or milli seconds. This is followed by a short duration weld arc of low voltage, high amperage. As stated above, the wire from which the chain is formed may be any of a variety of metals including mild steel, sterling silver, gold alloys, brass alloys, nickel alloys to list a few. The size of the wire is generally between approximately 0.003 inch and 0.250 inch or more and formed with either butt or bias joints. The gap is generally between approximately 0.001 and 0.090 inch. The bank of capacitors shown (C13–C15) gives a choice of charge between 100 and 24,000 microfarads, however, it will be understood that stored or continuous energy, AC or DC, can be employed. Further, although an arc generator is shown in the drawings, other field producing means can be used such as magnetos, coils and capacitors. The voltage of the first or ionizing arc is between 100 and 5000 volts. The controlled atmosphere, which although not essential is preferred because it minimizes carbon residue at the work piece and helps to keep electrode 264 clean. The particular atmosphere employed can be nitrogen, argon, helium or other conventional gases or combinations thereof. The electrode, in addition to tungsten, could be of other suitable material such as beryllium copper, molybdenum or their alloys.

The foregoing and other advantages are obvious to those skilled in the art.

We claim:

1. A welding system having work piece supporting means, an electrode head, electrode head supporting means, means for providing relative motion between the work piece supporting means and the electrode head supporting means, power source means for providing electrical energy to be transmitted from an electrode mounted on the electrode head to a work piece disposed at the work piece supporting means, characterized in that the electrode head supporting means includes a target adjusting block having a top portion and a bottom portion, the top portion having a top surface and the bottom portion having a bottom surface, an aperture formed in the top and bottom surfaces and extending therebetween, an electrode head receiving sleeve disposed in the aperture and fixed to one of the portions, the aperture formed in the other portion enlarged to permit lateral movement of the sleeve therewithin, the top and bottom portions adjustably movable relative to one another to change the position of the electrode head receiving sleeve relative to the work piece supporting means, the electrode head comprising a generally tubular, elongated sleeve of electrical insulating material, and further including a vertical adjusting block having a bore extending therethrough, the bore receiving therein the elongated sleeve, hook means extending laterally from the vertical adjusting block, a rod extending upwardly from the top surface of the top portion of the target adjusting block, a collar disposed on the rod and adjustably movable along the length of the rod, the elongated sleeve and the vertical adjusting block adapted to be pivoted with the hook means engageable with the rod and collar.

2. A welding system according to claim 1 further characterized in that the top and bottom portions each have a contiguous surface portion on which adjustment is effected by sliding movement of one of the top and bottom portions on the other of the top and bottom portions.

3. A welding system according to claim 2 further characterized in that the contiguous surface lies generally in a plane and means are provided to effect sliding movement along a first axis lying in the plane.

4. A welding system according to claim 3 further characterized in that means are provided to effect sliding movement along a second axis lying in the plane generally perpendicular to the first axis.

5. A welding system according to claim 4 further characterized in that two threaded rods extend from one of the top and bottom portions in a direction parallel to a respective first and second axis lying in the plane, a respective reaction surface is attached to the top and bottom portions, and a threaded member is received on each threaded rod and is adapted to be moved along respective threaded rod transferring a force to the reaction surface to cause adjustment movement of the portions relative to one another in a direction parallel to a respective first or second axis.

6. A welding system according to claim 1 further characterized in that the hook means comprise a pair of elements adapted to be received above and below the collar whereby movement of the collar along the rod will cause concomitant movement of the elongated sleeve in a direction generally vertical relative to the target adjusting block.

7. A welding system according to claim 1 in which a lock aperture is formed in the top surface of the top portion of the target adjusting block and a spring biased lock pin is movably mounted on the vertical adjusting block, the lock pin adapted to slide into the lock aperture when the vertical adjusting block is pivoted into the hooks engaged position.

8. A welding electrode support means characterized in that the support includes a target adjusting block having top and bottom portions, the top and bottom portions being slidably movable relative to one another on generally planar contiguous surfaces, the bottom portion being attached to an arm, a first threaded rod extending laterally from a side of the top portion and a second threaded rod extending laterally from the top portion, the rods disposed generally at right angles to one another, a first pair of spaced bars attached to the bottom portion and a second pair of spaced bars attached to the top portion, the first threaded rod extending between the first pair of bars with a threaded rotatable member disposed on the first rod between the bars of the first pair of bars and the second threaded rod extending between the second pair of bars with a threaded rotatable member disposed on the second rod between the bars of the second pair of bars so that movement of a rotatable member will transfer motion to move the top portion relative to the bottom portion, an electrode head receiving aperture extending through the top and bottom portions from a top to a bottom surface, a sleeve extending through the electrode head receiving aperture in the top and bottom portions whereby movement of the top and bottom portions relative to one another effects a change in the position of the sleeve an electrode head received in the electrode head receiving aperture, hook means connected to the electrode head, a rod extending from the target adjusting block and having thereon a member adjustably movable along the length of the rod, the hook means engageable with the rod and member at selected locations along the rod.

9. A welding electrode support means characterized in that the support means includes a block having a top and bottom surface, an electrode head receiving aperture formed in the block extending from the top surface to the bottom surface, a threaded rod extending upwardly from the top surface, a threaded collar adjustably movable on the threaded rod, a generally elongated, cylindrical electrode head slidably received in the electrode head receiving aperture, a vertical adjustment block, a bore extending through the vertical adjustment block, the electrode head received in the bore of the vertical adjustment block, hook means extending laterally from the vertical adjustment block, the vertical adjustment block adapted to be pivoted with the hook means engageable with the rod and collar.

10. A welding electrode support means according to claim 9 further characterized in that the hook means comprise a pair of elements adapted to be received above and below the collar whereby movement of the collar along the rod will cause concomitant movement of the cylindrical electrode head in a direction generally vertical relative to the block having the top and bottom surface.

11. A welding electrode support means according to claim 10 further characterized in that a lock aperture is formed in the said top surface of the block and a spring biased lock pin is movably mounted on the vertical adjusting block, the lock pin adapted to slide into the lock aperture when the vertical adjusting block is pivoted into the hooks engaged position.

12. A welding system having work piece supporting means, an electrode head, electrode head supporting means, means for providing relative motion along a path between the work piece supporting means and the electrode head, power source means for providing electrical energy to be transmitted from an electrode mounted in the electrode head to a work piece disposed at the work piece supporting means, the electrode head including an electrically insulative sleeve having a tip end in which the electrode is telescopically received in spaced relation thereto characterized in that slag wiper means is disposed adjacent to the tip end of the sleeve, the wiper means being adapted to remove slag from the tip end of the sleeve following the transmission of electrical energy from the electrode to the work piece.

13. A welding system according to claim 12 in which the tip end is provided with a face further characterized in that the wiper means includes a first relatively rigid wiper adapted to move across the face of the tip end to shear off slag disposed thereon and a second relatively flexible, curved elongated wiper is adapted to engage the edge formed between the face and the outer peripheral surface of the sleeve.

14. A chain making apparatus having a cycle of operation which includes clamping a wire and bending a portion thereof into a loop, severing the loop from the remainder of the wire, means closing the loop and inserting the severed end of the remainder of the wire through the loop characterized in that electrode head supporting means is mounted so that an electrode is brought into a selected location adjacent the ends of a closed loop each cycle of the operation of the apparatus, the supporting means comprising an arm having a first electrode head supporting end and a second cam follower end, the arm pivotably mounted intermediate its ends, an elongated, generally tubular electrode head having an electrically insulative sleeve with an open tip end, the tip end having a face, the electrode disposed within the sleeve spaced therefrom and spaced inwardly of the face, a cam attached to the chain making apparatus with the cam follower biased into contact with the cam, the cam having a profile selected so that the arm is caused to pivot bringing the tip end of the electrode head through a path to and from the selected location adjacent the ends of a closed loop for a selected portion of a revolution of the cam, and slag wiper means disposed adjacent to the said path, the wiper means being adapted to remove slag from the tip end of the sleeve on each revolution of the cam.

15. A chain making apparatus according to claim 14 further characterized in that the wiper means includes a first relatively rigid wiper adapted to move across the face of the tip end to shear off slag deposited thereon and a second relatively flexible, curved elongated wiper adapted to engage the edge formed between the face and the outer peripheral surface of the sleeve.

16. A chain making apparatus according to claim 14 further characterized in that the electrode head supporting means includes a target adjusting block having a top portion and a bottom portion, the top portion having a top surface and the bottom portion having a bottom surface, an aperture formed in the top and bottom surfaces and extending therebetween, an electrode head receiving sleeve disposed in the aperture and fixed to one of the portions, the aperture formed in the other portion enlarged to permit lateral movement of the sleeve therewithin, the top and bottom portions adjustably movable relative to one another to change the position of the electrode head receiving sleeve relative to the work piece supporting means.

17. A chain making apparatus according to claim 16 further characterized in that the top and bottom portions each have a contiguous surface portion on which adjustment is effected by sliding movement of one of the top and bottom portions on the other of the top and bottom portions.

18. A chain making apparatus according to claim 17 further characterized in that the contiguous surface lies generally in a plane and means are provided to effect sliding movement along a first axis lying in the plane.

19. A chain making apparatus according to claim 18 further characterized in that means are provided to effect sliding movement along a second axis lying in the plane generally perpendicular to the first axis.

20. A chain making apparatus according to claim 19 further characterized in that two threaded rods extend from one of the top and bottom portions in a direction parallel to a respective first and second axis lying in the plane, a respective reaction surface is attached to the top and bottom portions, and a threaded member is received on the each threaded rod and is adapted to be moved along the respective threaded rod transferring a force to the reaction surface to cause adjustment movement of the portions relative to one another in a direction parallel to a respective first or second axis.

21. A chain making apparatus having a cycle of operation which includes clamping a wire and bending a portion thereof into a loop, severing the loop from the remainder of the wire, means closing the loop and inserting the severed end of the remainder of the wire through the loop characterized in that electrode head supporting means is mounted so that an electrode is brought into a selected location adjacent the ends of a closed loop each cycle of the operation of the apparatus, the supporting means comprising an arm having a first electrode head supporting end and a second cam follower end, the arm pivotably mounted intermediate its ends, an elongated, generally tubular electrode head having an electrically insulative sleeve with an open tip end, the tip end having a face, the electrode disposed within the sleeve spaced therefrom and spaced inwardly of the face, a cam attached to the chain making apparatus with the cam follower biased into contact with the cam, the cam having a profile selected so that the arm is caused to pivot bringing the tip end of the electrode head into the selected location adjacent the ends of a closed loop for a selected portion of a revolution of the cam, the electrode head supporting means including a vertical adjusting block having a bore extending therethrough, the bore receiving therein the elongated sleeve, hook means extending laterally from the vertical adjusting block, a target adjusting block having a top portion and a top surface thereof, a rod extending upwardly from the top surface of the top portion of the target adjusting block, a collar disposed on the rod and adjustably movable along the length of the rod, the elongated sleeve and the vertical adjusting block adapted to be pivoted with the hook means engageable with the rod and collar.

22. A chain making apparatus according to claim 21 further characterized in that the hook means comprise a pair of elements adapted to be received above and below the collar whereby movement of the collar along the rod will cause concomitant movement of the elongated sleeve in a direction generally vertical relative to the target adjusting block.

23. A chain making apparatus according to claim 21 further characterized in that a lock aperture is formed in the top surface of the top portion of the target adjusting block and a spring biased lock pin is movably mounted on the vertical adjusting block, the lock pin adapted to slide into the lock aperture when the vertical adjusting block is pivoted into the hooks engaged position.

* * * * *